Figure 1:
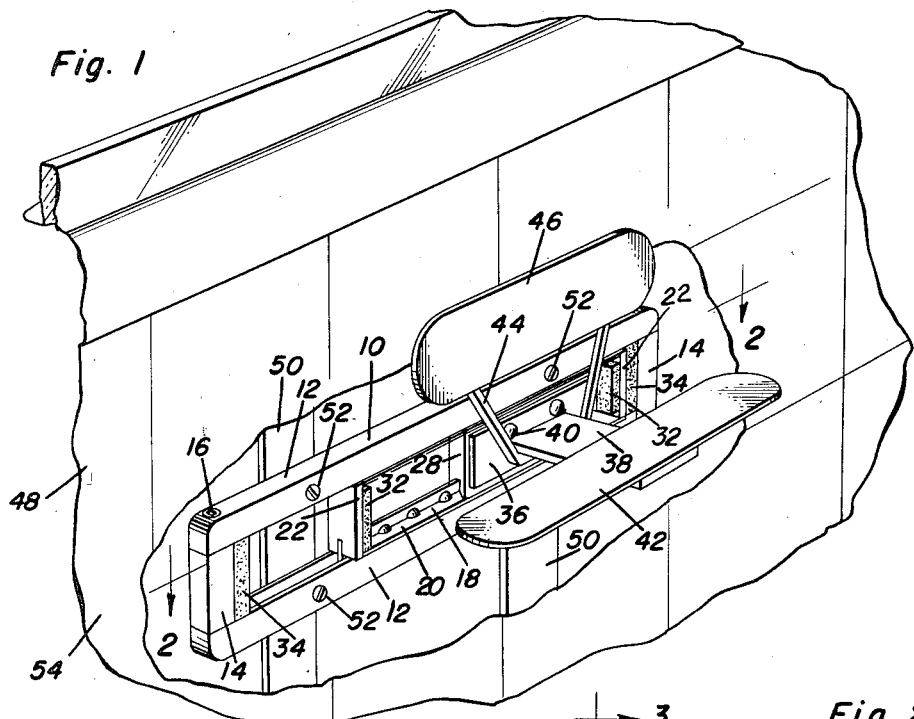

Oct. 5, 1954  J. B. AHERN  2,690,794
ARMREST WITH DOOR PANEL SHIELD
Filed June 26, 1952

James B. Ahern
INVENTOR.

UNITED STATES PATENT OFFICE 2,690,794

ARMREST WITH DOOR PANEL SHIELD

James B. Ahern, Center Line, Mich.

Application June 26, 1952, Serial No. 295,666

5 Claims. (Cl. 155—198)

This invention relates in general to automobile constructions, and more specifically to an arm rest for a front door of an automobile.

In the conventional automobiles now on the market, the driver's door is quite often provided with an arm rest on which the driver of the automobile may rest his arm while driving. Inasmuch as the arm, the left arm of the driver, is constantly moving during the steering of the automobile, there is frictional engagement between the surface of the arm rest and the clothing in the vicinity of the elbow of the left arm of the driver. In the cases of many persons who spend much time driving, the left arms of their clothing is often worn out due to the frictional engagement. Also, after the automobile has been driven a long period of time the upholstery on the arm rest is also worn. It is, therefore, desirable to provide an arm rest which will effectively support the left arm of a driver of an automobile and at the same time eliminate the costly frictional sliding engagement between the left arm of the driver and the arm rest.

The primary object of this invention is to provide an improved arm rest for a door of an automobile which will eliminate the sliding movement between the driver's left arm and the arm rest provided for supporting the arm whereby operation of the automobile will be facilitated and at the same time costly wearing out of clothing and upholstery will be eliminated.

Another object of this invention is to provide an improved arm rest which has an arm supporting portion that is slidable with respect to the automobile door which is mounted whereby the arm supporting portion may be moved with the arm supported thereon during the operation of the automobile.

Another object of this invention is to provide an improved arm rest construction for automobile doors, said arm rest construction including both an arm supporting portion and a door panel shield whereby a supported arm of an operator of the automobile so equipped does not come into frictional contact with any portion of the door.

Another object of this invention is to provide an improved door construction which includes an arm rest, said arm rest being of a relatively simple construction and easily formed whereby the same is economically feasible.

A further object of this invention is to provide an improved slide mechanism which is so constructed that a limited number of bearings may be utilized for supporting a movable support during its sliding movement in an elongated mounting frame.

Figure 2:
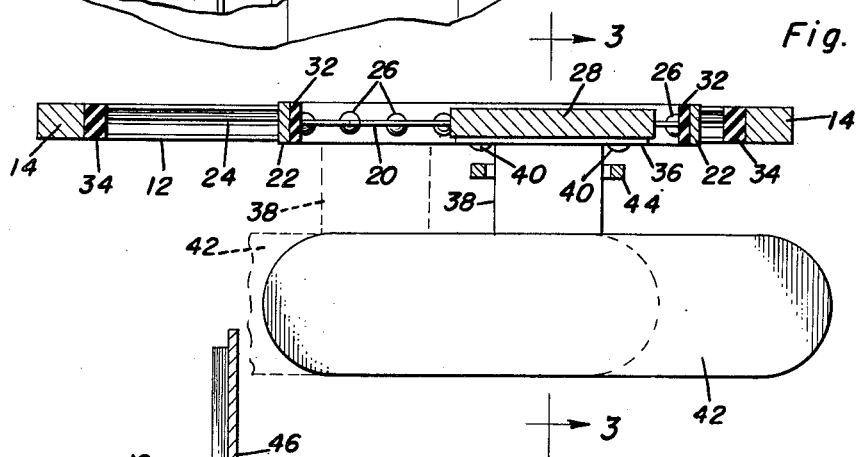
Figure 3:
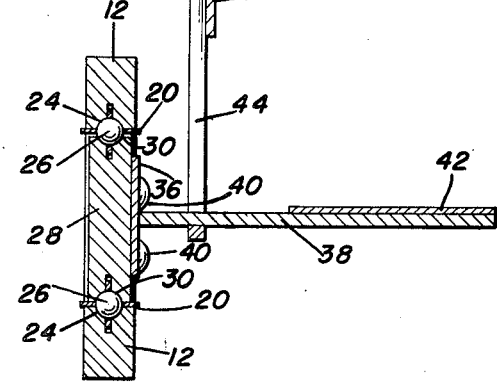

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application and in which:

Figure 1 is an enlarged perspective fragmentary view of a portion of a conventional left front door of an automobile, the door having mounted thereon the improved arm rest construction, which is the subject of this invention, a portion of the door being broken away and shown in section in order to clearly illustrate the construction of the arm rest and the manner in which it is secured thereto;

Figure 2 is an enlarged longitudinal horizontal sectional view taken substantially upon the plane indicated by the section line 2—2 of Figure 1 and shows the general arrangement of the elements of the arm rest construction, and also another position of the arm supported portion being shown by dotted lines; and Figure 3 is an enlarged transverse vertical sectional view taken substantially upon the plane indicated by the section line 3—3 of Figure 2 and shows the manner in which the various portions of the arm rest construction are mounted for sliding movement.

Similar characters of reference designate similar or identical elements and portions throughout the specification and throughout the different views of the drawings.

Referring now to the drawings in detail, it will be seen that the arm rest construction, which is the subject of this invention, includes a mounting frame, which is referred to in general by the reference numeral 10. The mounting frame 10 includes a pair of longitudinally extending, spaced parallel rails 12 which are removably connected to end members 14 by conventional fasteners 16. It will be noted that the mounting frame 10 is in the form of an elongated rectangular structure. Mounted within the mounting frame 10 and supported by the rails 12 thereof is an elongated rectangular mounting carriage, which is referred to in general by the reference numeral 18. The bearing carriage includes a pair of longitudinally extending frame members 20 which are in spaced parallel relation, and are connected together at their ends by end frame members 22.

As is best illustrated in Figure 3, the rails 12 have formed in their inner opposed edges opposed guideways 24. Each of the guideways 24 includes a substantially semi-circular cross sectional inner portion and a narrow vertically extending slot which forms the outer portion thereof. It will be noted that the frame members 20 are cruciform in outline and have two arms thereof extending horizontally with two arms extending vertically. The horizontal arms of the longitudinal frame members 20 engage the inner surfaces of the rails 12 and the outermost vertical arm of each of the longitudinal frame members is disposed within the vertically extending slot portion of its associated guideway 24 formed in its associated rail 12. Positioned at spaced intervals and rotatably carried by the longitudinal frame members 20 are ball bearings 26 which engage the semi-circular inner portions of the guideways 24 and facilitate the movement of the bearing carriage 18 along the rails 12.

Mounted within the bearing carriage 20 for longitudinal movement therein is a movable support 28, the movable support 28 being in the form of a solid block. The movable support 28 has formed in its longitudinal edges guideways 30 which are identical to the guideways 24 in the rails 12 and are in opposing relation thereto. The guideways 30 receive the innermost arms of the longitudinal frame members 20, which form guides, and are in engagement with ball bearings 26 carried by the frame members 20. The ball bearings 26 also facilitate the movement of the movable support 28 with respect to the bearing carriage 18. In order that the stopping of both the movable support 28 and the bearing carriage 18 may not be abrupt, the bearing carriage has secured to the inner sides of its end frame members 22 resilient pads 32 for engaging the ends of the movable support 28 and cushioning the stopping of the same. The end members 14 of the mounting frame 10 are provided on their inner sides with similar resilient pads 34 which are engaged by the end frame members 22 of the bearing carriage 18 and cushion the stopping thereof.

Secured to the inner surface of the movable support 28 is a plate 36 which has an outwardly extending horizontal plate member 38 rigidly connected thereto. The plate 36 is connected to the movable support 28 by a plurality of fasteners 40. Secured to the upper surface of the plate member 38 is a longitudinal extending arm rest plate 42, the arm rest plate being in spaced parallel relation to the mounting frame 10. Also carried by the plate member 38 is a U-shaped bracket 44, the bracket 44 being disposed adjacent the plate 36 and in spaced parallel relation thereto. Secured to the upper ends of the U-shaped bracket 44 and extending longitudinally therebeyond is an elongated plate in the form of a shield 46, the shield being in spaced parallel, vertically offset relation to the plate 36.

Referring now to Figure 1 in particular, it will be seen that there is illustrated a conventional door construction, which is referred to in general by the reference numeral 48. The door construction 48 includes a pair of vertically extending frame members 50 to which the rails 12 of the mounting frame 10 are secured by fasteners 52. It will be understood that the mounting frame and the other portions of the arm rest contained within the confines thereof will be positioned within the door 48 and covered by a door panel 54 forming the inside surface of the door 48. The door panel 54 will obviously have an elongated slot (not shown) through which the plate member 38 extends so that the shield 46 and the arm rest plate 42 will be positioned within the vehicle to which the door 48 is attached and in a position to be engaged by the left arm of a driver of the vehicle. It will be understood that the arm rest plate 42, the shield 46, the U-shaped bracket 44, and the member 38 will be upholstered as desired.

After the arm rest construction, which is the subject of this invention, has been properly installed in the door 48, it will be seen that the driver of the vehicle will rest his left elbow and adjoining portions of his left arm on the upholstery supporting arm rest plate 42 and in engagement with the upholstery shield 46. With the left arm so positioned, when the operator of the vehicle so equipped turns a steering wheel (not shown) the supporting arm rest plate 42 and the shield 46 will move with the driver's arm and the frictional sliding action that occurs with fixed arm rest is eliminated.

The operation of this device will be understood from the foregoing description of the details thereof, taken in connection with the above recited objects and drawings. Further description would appear to be unnecessary.

Minor modifications of the device, varying in minor details from the embodiment of the device illustrated and described here, may be resorted to without departure from the spirit and scope of this invention, as defined in the appended claims.

Having described the invention, what is claimed as new is:

1. An arm rest for a vehicle door having an inside panel provided with a horizontal slot, said arm rest comprising a mounting frame fixed within the door and covered by said panel, a support member mounted within the confines of said frame for guided movement therein, a horizontal member carried by said support member and projecting through said slot, an arm rest plate supported by said horizontal member and spaced from said panel.

2. An arm rest for a vehicle door having an inside panel provided with a horizontal slot, said arm rest comprising a mounting frame fixed within said door and covered by said panel, a support member mounted within the confines of said frame for guided movement therein, a horizontal member carried by said support member and projecting through said slot, an arm rest plate supported by said horizontal member and spaced from said panel, a panel shield rigidly carried by said horizontal member and movable therewith.

3. An arm rest for a vehicle door having an inside panel provided with a horizontal slot, said arm rest comprising a rectangular mounting frame fixed within said door and covered by said panel, a rectangular bearing carriage mounted within the confines of said mounting frame for guided movement therein, a support member mounted within the confines of said bearing carriage for guided movement therein, a horizontal member carried by said support member and projecting through said slot, an arm rest plate supported by said horizontal member and spaced from said panel.

4. An arm rest for a vehicle door having an inside panel provided with a horizontal slot, said arm rest comprising a rectangular mounting frame fixed within said door and covered by said panel, a rectangular bearing carriage mounted within the confines of said mounting frame for guided movement therein, a support member mounted within the confines of said bearing carriage for guided movement therein, a horizontal member carried by said support member and projecting through said slot, an arm rest plate supported by said horizontal member and spaced from said panel, resilient buffers carried by inner surfaces of the end of said mounting frame and said bearing carriage.

5. An arm rest for a vehicle door having an inside panel provided with a horizontal slot, said arm rest comprising a rectangular mounting frame fixed within said door and covered by said panel, a rectangular bearing carriage mounted within the confines of said mounting frame for guided movement therein, a support member mounted within the confines of said bearing carriage for guided movement therein, a horizontal member carried by said support member and projecting through said slot, an arm rest plate supported by said horizontal member and spaced from said panel, longitudinal members of said bearing carriage being cruciform in cross-section, bearing elements carried by each of said longitudinal members.

References Cited in the file of this patent

UNITED STATES PATENTS

| Number | Name | Date |
|---|---|---|
| 1,005,055 | Miller | Oct. 3, 1911 |
| 1,045,523 | Cossey | Nov. 26, 1912 |
| 1,144,670 | Watson | June 29, 1915 |
| 1,742,447 | McKeag | Jan. 7, 1930 |

FOREIGN PATENTS

| Number | Country | Date |
|---|---|---|
| 106,569 | Australia | Feb. 16, 1939 |